(12) United States Patent
Gabrielov et al.

(10) Patent No.: US 9,920,259 B2
(45) Date of Patent: Mar. 20, 2018

(54) COMPOSITION USEFUL IN THE HYDROPROCESSING OF A HYDROCARBON FEEDSTOCK

(71) Applicant: SHELL OIL COMPANY, Houston, TX (US)

(72) Inventors: Alexei Grigorievich Gabrielov, Houston, TX (US); Ed Ganja, The Woodlands, TX (US); Theofiel Meuris, Magnolia, TX (US); Maxim Vasilievich Ovchinnikov, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 316 days.

(21) Appl. No.: 14/816,531

(22) Filed: Aug. 3, 2015

(65) Prior Publication Data

US 2015/0337221 A1 Nov. 26, 2015

Related U.S. Application Data (62) Division of application No. 12/614,513, filed on Nov. 9, 2009, now Pat. No. 9,132,421.

(51) Int. Cl.
| | |
|---|---|
| *C10G 45/08* | (2006.01) |
| *C10G 45/06* | (2006.01) |
| *B01J 31/02* | (2006.01) |
| *B01J 21/04* | (2006.01) |
| *B01J 23/75* | (2006.01) |
| *B01J 23/755* | (2006.01) |
| *B01J 23/88* | (2006.01) |
| *B01J 23/882* | (2006.01) |
| *B01J 23/883* | (2006.01) |
| *B01J 27/19* | (2006.01) |
| *B01J 35/02* | (2006.01) |
| *B01J 35/10* | (2006.01) |
| *B01J 37/02* | (2006.01) |

(52) U.S. Cl.
CPC ............. *C10G 45/08* (2013.01); *B01J 21/04* (2013.01); *B01J 23/75* (2013.01); *B01J 23/755* (2013.01); *B01J 23/88* (2013.01); *B01J 23/882* (2013.01); *B01J 23/883* (2013.01); *B01J 27/19* (2013.01); *B01J 31/02* (2013.01); *B01J 31/0201* (2013.01); *B01J 31/0235* (2013.01); *B01J 35/026* (2013.01); *B01J 35/1019* (2013.01); *B01J 35/1042* (2013.01); *B01J 35/1066* (2013.01); *B01J 37/0203* (2013.01); *B01J 37/0207* (2013.01); *C10G 45/06* (2013.01); *C10G 2300/1044* (2013.01); *C10G 2300/1051* (2013.01); *C10G 2300/1055* (2013.01); *C10G 2300/1059* (2013.01); *C10G 2300/1088* (2013.01); *C10G 2300/301* (2013.01)

(58) Field of Classification Search
CPC .................... C10G 45/06; C10G 45/08; B01J 31/0235–31/0254
See application file for complete search history.

(56) References Cited

U.S. PATENT DOCUMENTS

| | | |
|---|---|---|
| 3,959,179 A | 5/1976 | Mikovsky et al. |
| 4,746,420 A | 5/1988 | Darian et al. |
| 4,812,228 A | 3/1989 | Angevine et al. |
| 4,943,547 A | 7/1990 | Seamans et al. |
| 4,969,990 A | 11/1990 | Simpson |
| 4,981,832 A | 1/1991 | Tawara et al. |
| 5,177,047 A | 1/1993 | Threlkel |
| 5,200,381 A | 4/1993 | Kamo |
| 5,215,954 A | 6/1993 | Seamans et al. |
| 5,221,656 A | 6/1993 | Clark et al. |
| 5,232,888 A | 8/1993 | Kamo |
| 5,244,858 A | 9/1993 | Usui et al. |
| 5,292,702 A | 3/1994 | Seamans et al. |
| 5,322,829 A | 6/1994 | Artes et al. |
| 5,338,717 A | 8/1994 | Aldridge et al. |
| 5,397,456 A | 3/1995 | Dao et al. |
| 5,444,033 A | 8/1995 | Usui et al. |
| 5,498,586 A | 3/1996 | Dai et al. |
| 5,688,736 A | 11/1997 | Seamans et al. |
| 6,329,314 B1 | 12/2001 | Mignard et al. |
| 6,436,870 B1 | 8/2002 | Lijima et al. |
| 6,540,908 B1 | 4/2003 | Eijsbouts et al. |
| 6,509,291 B2 | 6/2003 | Eijsbouts |

(Continued)

FOREIGN PATENT DOCUMENTS

| | | |
|---|---|---|
| CN | 1890351 | 1/2007 |
| WO | 2005035691 | 4/2005 |

(Continued)

OTHER PUBLICATIONS

Ceperley et al.; "Ground State of Electron Gas by a Stochastic Method"; Physical Review Letters, vol. 45, No. 7, pp. 566-569; Aug. 18, 1980.

Delley, B.; "An All-Electron Numerical Method for Solving the Local Density Functional for Polyatomic Molecules"; J. Chem. Phys., vol. 92, No. 1; pp. 508-517; Jan. 1, 1990.

Dewar Michael J.S.; "Development and Status of MINDO/3 and MNDO"; Journal of Molecular Structure; pp. 41-50; 1983.

Shimizu et al; "Effects of Adding Chelating Agent During Preparation of Co—Mo Desulphurisation Catalysts (Part 2); Influence of Nitrilotriacetic Acid Addition on Surface Structure"; Sekiyu Gakkashi, vol. 39, No. 2; 1996.

(Continued)

*Primary Examiner* — Renee Robinson (74) *Attorney, Agent, or Firm* — Charles W. Stewart (57) ABSTRACT

A composition having a substantial or material absence of or no phosphorous and comprising a support material, a metal compound and either a hydrocarbon oil or a polar additive or a combination of both a hydrocarbon oil and polar additive. The polar additive has particularly defined properties including having a dipole moment of at least 0.45. The composition is useful in the hydroprocessing of hydrocarbon feedstocks, and it is especially useful in the hydrotreating of vacuum gas oils and petroleum resid feedstocks.

15 Claims, 1 Drawing Sheet

(56) References Cited

U.S. PATENT DOCUMENTS

| | | |
|---|---|---|
| 6,872,678 B2 | 3/2005 | Eijsbouts et al. |
| 7,011,807 B2 | 3/2006 | Zhou et al. |
| 2005/0040078 A1 | 2/2005 | Zinnen et al. |
| 2005/0109674 A1 | 5/2005 | Klein |
| 2005/0266985 A1 | 12/2005 | Iwata |
| 2007/0155618 A1 | 7/2007 | Diehl et al. |
| 2007/0275845 A1 | 11/2007 | Jansen et al. |
| 2009/0038993 A1 | 2/2009 | Gabrielov et al. |

FOREIGN PATENT DOCUMENTS

| | | |
|---|---|---|
| WO | 2009020913 | 2/2009 |
| WO | 2010107908 | 9/2010 |

OTHER PUBLICATIONS

Perdew et al.; "Accurate and Simple Analytic Representation of the Electron-Gas Correlation Energy"; Physical Review B, vol. 45, No. 23; pp. 244-249; Jun. 15, 1992.

Roothaan, C.C.J.; "New Developments in Molecular Orbital Theory"; Review of Modern Physics, vol. 23, No. 2; pp. 69-89; Apr. 1951.

Hedin et al.; "Explicit Local Exchange-Correlation Potentials"; J. Phys. C; Solid St. Phys., vol. 4; 2064-2083; 1971.

Hohenberg et al.; "Inhomogeneous Electron Gas"; Physical Review; vol. 136, No. 3B; pp. 864-871; Nov. 9, 1964.

Levy, Mel; "Universal Variational Functionals of Electron Densities, First-Order Density Martrices, and Natural Spin-Orbitals and Solution of the V-Representability Problem"; Proc. Natl. Acad. Sci. USA, vol. 76, No. 12, pp. 6062-6065; Dec. 1979.

Slater, John; "Statistical Exchange-Correlation in the Self-Consistent Field"; Quantum Theory Project, University of Florida and Solid-State and Molecular Theory Group, Massachusetts Institute of Technology; pp. 1-92.

Takehiro et al., "Effects of Chelating Agents as Additives on Preparation of Co—Mo Hydrodesulfurization Catalysts, Part 2, Effect of Nitrilotriacetic Acid Addition on Surface Structure," Sekiyu Gakkaishi, vol. 39, No. 2, 1996, pp. 158-165 (English translation).

Otsuki et al., "Oxidative Desulfurization of Light Gas Oil and Vacuum Gas Oil by Oxidation and Solvent Extraction," Energy & Fuels 2000, vol. 14, No. 6, pp. 1232-1239.

COMPOSITION USEFUL IN THE HYDROPROCESSING OF A HYDROCARBON FEEDSTOCK

This application is a divisional of U.S. application Ser. No. 12/614,513, filed Nov. 9, 2009, publication US20110108461 May 12, 2011, incorporated herein by reference.

This invention relates to a composition useful in the catalytic hydroprocessing of hydrocarbon feedstocks and that has a material absence of phosphorous and is impregnated with a polar additive.

As a result of the recently reduced requirements on the sulfur concentration limits for diesel fuels, there has been a great effort by those in industry to find new hydrotreating catalyst formulations and products that may be used in the manufacture of low-sulfur diesel and other products. One catalyst taught by the art for use in the hydrotreating of certain hydrocarbon feedstocks so as to meet some of the more stringent sulfur regulations is disclosed in U.S. Pat. No. 5,338,717. In this patent, a hydrotreating catalyst is disclosed that is made by impregnating a Group VI (Mo and/or W) heteropolyacid onto a support followed by treating the impregnated support with an aqueous solution of a reducing agent that may be dried and thereafter impregnated with a Group VIII (Co and/or Ni) metal salt of an acid having an acidity of less than that of the Group VI heteropolyacid. This impregnated support is then dried and sulfided to provide a final catalyst. The catalyst composition disclosed in the '717 patent may also be made by impregnating a support with both the Group VIII metal salt and the Group VI heteropolyacid followed by drying and then treating with a reducing agent, drying again, and sulfiding to form the final catalyst.

Another catalyst useful in the deep hydrodesulfurization and in other methods of hydrotreating hydrocarbon feedstocks and a method of making such catalyst and its activation are disclosed in U.S. Pat. No. 6,872,678. The catalyst of the '678 patent includes a carrier upon which a Group VIB hydrogenation metal component and/or a Group VIII hydrogenation metal component and a sulfur-containing organic compound additive are incorporated and further which has been contacted with a petroleum fraction organic liquid. The catalyst is treated with hydrogen either simultaneously with or after the incorporation of the organic liquid (petroleum fraction).

In U.S. Pat. No. 6,509,291 is disclosed a catalyst and a process for sulfiding a catalyst composition that comprises a hydrogenation metal component of either a Group VI metal or a Group VIII metal, or both, and a sulfur-containing organic additive and which has first been contacted with an organic liquid (petroleum fraction) before being sulfided. The organic liquid ensures that the catalyst is able to withstand the treatment conditions prevailing during the actual sulfidation step. The sulfidation is done by contacting the additive-containing catalyst that has first been contacted with the organic liquid with gaseous hydrogen and a sulfur-containing compound that is either $H_2S$ and/or a compound that is decomposable into $H_2S$ to provide the sulfided catalyst.

U.S. Pat. No. 6,329,314 discloses a process for the activation of a hydroconversion catalyst that contains a Group VIII metal component and, optionally, a Group VI metal component by impregnating the catalyst with liquid phase petroleum fraction, a thionic compound and a nitrogenous compound under certain specified conditions.

U.S. Pat. No. 6,540,908 discloses a process for preparing a sulfided hydrotreating catalyst. This process involves combining a catalyst carrier of alumina and a hydrogenation metal catalyst carrier with an organic compound that includes a covalently bonded nitrogen atom and a carbonyl moiety followed by sulfiding the resulting combination.

There is an ongoing need to find improved higher activity hydrotreating catalysts. There is also a need to find more economical manufacturing methods and improved methods of activating hydrotreating catalysts so as to provide catalysts having better activity than catalysts activated by alternative methods.

Accordingly, provided is an inventive composition having a material absence of phosphorous and comprising a support material, a metal compound and a polar additive having a dipole moment of at least 0.45. Another inventive composition consists essentially of a support material that is loaded with an active metal precursor and a polar additive having a dipole moment of at least 0.45, wherein the support material is thereafter treated with a gas comprising hydrogen. The inventive compositions are made by a method that comprises incorporating a metal-containing solution having a substantial absence of phosphorous into a support material to provide a metal-incorporated support material, and incorporating a polar additive having a dipole moment of at least 0.45 into the metal-incorporated support material to thereby provide an additive impregnated composition. The inventive compositions or those made by the inventive methods may be used in a process comprising contacting under hydrodesulfurization conditions a hydrocarbon feedstock with any one of inventive compositions.

In the published patent application, US 2009/0038993, is disclosed a hydrocarbon oil-impregnated composition that is especially useful in applications involving the catalytic hydroprocessing of hydrocarbon feedstocks. One of the benefits provided by this hydrocarbon-oil impregnated composition is that it can be used in a reactor system which is started up using a delayed feed introduction procedure. In this procedure, the hydrocarbon oil-impregnated composition undergoes a hydrogen treatment. The novel hydrocarbon oil-impregnated composition or derivatives thereof can exhibit particularly good hydrodesulfurization catalytic activity when used in such applications. This patent application teaches that it is desirable for the hydrocarbon oil-impregnated composition to contain a phosphorous component.

Presented in U.S. Pat. No. 8,262,905 is a composition that is especially useful in the hydroprocessing of hydrocarbon feedstocks or may be convertible into a composition that has particularly good catalytic properties. One embodiment of the composition disclosed in this patent application includes the use of a hydrocarbon oil that may be similar to the hydrocarbon oil used in the hydrocarbon-oil impregnated composition of US 2009/0038993 along with the use of a particularly defined polar additive. It is further taught that it is desirable for the oil and polar additive containing composition to also include phosphorous (P) as one of its metal components in addition to the other metal components.

It has more recently been discovered that further improvements in the catalytic performance of certain of the compositions, or the derivatives thereof, taught in US 2009/0038993 and U.S. Pat. No. 8,262,905 can be improved by providing for the substantial or material absence of or no phosphorous in a composition comprising a support material, a metal compound and a polar additive. It has been found that these inventive, phosphorous-free or substantially phosphorous-free compositions, or derivatives thereof, have particularly good properties when used in the catalytic hydroprocessing of hydrocarbon feedstocks such as, for example, petroleum vacuum gas oils and resids.

One embodiment of the invention is a composition that has a substantial or material absence of or no phosphorous and further comprises a support material, a metal compound and a polar additive. This composition, or a derivative thereof, for example, those compositions that are derived by the treatment of the aforedescribed composition, having a substantial absence of, or material absence of or no phosphorous and comprising a support material, a metal compound and a polar additive, with hydrogen or a sulfur compound, or both, may particularly be used and have application in the hydroprocessing of hydrocarbon feedstocks and, in particular, vacuum gas oil feedstocks and petroleum resid feedstocks.

When referring herein to a composition having a substantial absence of phosphorous what is meant is that such a composition contains very little, if any, phosphorous, and that the composition is significantly, if not completely, free of the presence or of a concentration of phosphorous. Such substantial absence, thus, can be less than 0.25 weight percent of the total weight of the relevant composition, based on the phosphorous as the element, regardless of the form it is actually in. It is more desirable for the substantial absence of phosphorous to be less than 0.1 weight percent of the total weight of the composition, and, it is most desirable that the substantial absence of phosphorous to be less than 0.01 weight percent of the total weight of the composition.

When referring herein to the material absence of phosphorous that is contained a composition, what is meant is that the composition might contain a concentration of phosphorous as long as such concentration of phosphorous does not significantly or substantially affect the catalytic performance of the composition. It is believed that a material concentration of phosphorous is a small concentration, which may be less than a substantial absence of phosphorous.

When it is indicated that the composition has no phosphorous it is intended to mean that there is practically no phosphorous present in the composition.

While it is a significant feature of the inventive composition for it to have incorporated into its support material a hydrocarbon oil, or a polar additive, or a combination of both a polar additive and hydrocarbon oil, it is a further essential aspect of the inventive composition herein for it to have at least a substantial absence of, or a material absence of, or an absence of phosphorous.

It has been found that by excluding at least a material concentration or amount of phosphorous from the composition, which further comprises a support material, an active metal compound, and either a polar additive, or a hydrocarbon oil, or a combination of both a polar additive and a hydrocarbon oil, significant improvements in the catalytic hydrodesulfurization performance of the composition, or the derivatives thereof, are observed.

The reason for the aforementioned improvement in catalytic performance is not known with certainty, but it is theorized that when a phosphorous component is added to the composition that contains alumina as a support material the phosphorous compound reacts with the alumina to form aluminum phosphate ($AlPO_4$) species within the pores of the alumina support material of the composition. This may occur during the step or steps in which the phosphorous and other components of the composition are incorporated into the support material. The presence of the aluminum phosphate within the support material is thought to block a portion of the pore structure of the composition and inhibit the flow or mass transfer of molecules within the pores of the support material.

One of the beneficial features of the invention is that the composition does not need to be calcined or to have sulfur added to it prior to its placement into a reactor vessel or within a reactor system for use in the hydrodesulfurization of a hydrocarbon feedstock. This feature provides the particular benefit of significantly reducing certain costs that are associated with manufacturing and treatment of the composition, and it allows for the use of in situ activation methods that yield a catalyst composition which exhibits significantly improved hydrodesulfurization catalytic activity over certain other hydrodesulfurization catalyst compositions. The composition of the invention further allows for an improved procedure in the start-up of hydrodesulfurization reactor systems.

The composition of the invention includes a support material that has incorporated therein or is loaded with a metal component, which is or can be converted to a metal compound that has activity towards the catalytic hydrogenation of organic sulfur compounds or, otherwise, has application or use in the hydrodesulfurization of hydrocarbon feedstocks. This support material that contains the metal component further has incorporated therein a polar additive, or a hydrocarbon oil, or a combination of both a polar additive and a hydrocarbon oil, to thereby provide an oil or additive or oil/additive impregnated composition of the invention. The support material will contain no or be substantially free of phosphorous or have a material absence of phosphorous.

The support material of the inventive composition can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina.

In the preparation of various embodiments of the inventive composition, the metal component of the composition may be incorporated into the support material by any suitable method or means that provides a support material that is loaded with an active metal precursor, thus, the composition includes the support material and a metal component.

One method of incorporating the metal component into the support material, includes, for example, co-mulling the support material with the active metal or metal precursor to yield a co-mulled mixture of the two components of the support material component and the metal component.

Another method of incorporating the metal component into the support material includes the co-precipitation of the support material and metal component to form a co-precipitated mixture of the support material and metal component.

A preferred method of incorporating the metal component into the support material involves the impregnation of the support material with the metal component using any of the known impregnation methods such as incipient wetness to incorporate the metal component into the support material. When using the impregnation method to incorporate the metal component into the support material, it is preferred for the support material to first be formed into a shaped particle comprising an inorganic oxide material and thereafter be loaded with an active metal precursor, preferably, by the impregnation of the shaped particle with an aqueous solution having a substantial or material absence of or no phosphorous and comprising a metal salt to give a support material that contains a metal of a metal salt solution.

To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as cylinders, trilobes, etc. and nominal sizes such as 1/16", 1/8", 3/16", etc. The support material of the inventive composition, thus, preferably, is a shaped particle comprising an inorganic oxide material.

The shaped particle is then dried under standard drying conditions that can include a drying temperature in the range of from 50° C. to 200° C., preferably, from 75° C. to 175° C., and, most preferably, from 90° C. to 150° C.

After drying, the shaped particle is calcined under standard calcination conditions that can include a calcination temperature in the range of from 250° C. to 900° C., preferably, from 300° C. to 800° C., and, most preferably, from 350° C. to 600° C.

The calcined shaped particle can have a surface area (determined by the BET method employing $N_2$, ASTM test method D 3037) that is in the range of from 50 $m^2$/g to 450 $m^2$/g, preferably from 75 $m^2$/g to 400 $m^2$/g, and, most preferably, from 100 $m^2$/g to 350 $m^2$/g.

The mean pore diameter in angstroms (Å) of the calcined shaped particle is in the range of from 50 to 200, preferably, from 70 to 150, and, most preferably, from 75 to 125.

The pore volume of the calcined shaped particle is in the range of from 0.5 cc/g to 1.1 cc/g, preferably, from 0.6 cc/g to 1.0 cc/g, and, most preferably, from 0.7 to 0.9 cc/g. Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the calcined shaped particle is impregnated in one or more impregnation steps with a metal component using one or more aqueous solutions containing at least one metal salt wherein the metal compound of the metal salt solution is an active metal or active metal precursor. It is an essential feature of the invention that the aqueous impregnation solution or solutions used to incorporate the metal component into the calcined shaped particle have a substantial or material absence of or no phosphorous.

The metal elements of the metal salt or active metal compound or active metal precursor are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Among the Group 6 metals, molybdenum is preferred. Among the Groups 9 and 10 metals, cobalt is preferred.

For the Group 9 and 10 metals, the metal salts include Group 9 or 10 metal acetates, formates, citrates, oxides, hydroxides, carbonates, nitrates, sulfates, and two or more thereof. The preferred metal salts are metal nitrates, such as, for example, nitrates of nickel or cobalt, or both.

For the Group 6 metals, the metal salts include Group 6 metal oxides or sulfides. Preferred are salts containing the Group 6 metal and ammonium ion, such as, for example, ammonium heptamolybdate and ammonium dimolybdate.

The concentration of the metal compounds in the impregnation solution is selected so as to provide the desired metal content in the final composition of the invention taking into consideration the pore volume of the support material into which the aqueous solution is to be impregnated and the amounts of hydrocarbon oil or polar additive, or both, that are later to be incorporated into the support material that is loaded with the metal component. Typically, the concentration of metal compound in the impregnation solution is in the range of from 0.01 to 100 moles of metal compound per liter.

The metal content of the support material having a metal component incorporated therein may depend upon the application for which the oil or polar additive or oil/polar additive impregnated composition of the invention is to be used, but, generally, for hydroprocessing applications, the Group 9 and 10 metal component, i.e., cobalt or nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %. It has been determined that for the inventive composition with the substantial or material absence of or no phosphorous it is particularly advantageous for the Group 9 and 10 metal component to be cobalt as opposed to it being nickel, and it may be further advantageous for the inventive composition to exclude the material presence of nickel as a metal component.

The Group 6 metal component, i.e., molybdenum or tungsten, of the inventive composition is preferably, molybdenum, and it can be present in the support material having a metal component incorporated therein in an amount in the range of from 5 wt. % to 50 wt. %, preferably from 8 wt. % to 40 wt. %, and, most preferably, from 12 wt. % to 30 wt. %.

The above-referenced weight percents for the metal components are based on the dry support material and the metal component as the element regardless of the actual form of the metal component.

To provide the oil or polar additive or oil/polar additive impregnated composition of the invention, a suitable hydrocarbon oil or a suitable polar additive, or both, are incorporated into the support material that also has incorporated therein, as described above, the active metal precursor. The hydrocarbon oil or polar additive or a combination thereof are used to fill a significant portion of the available pore volume of the pores of the support material, which is already loaded with the active metal precursor, to thereby provide a composition that comprises a support material containing a metal component, hydrocarbon oil or a polar additive or a combination thereof.

The composition may be installed, as is, into a reactor vessel or within a reactor system that is to undergo a start-up procedure in preparation of or prior to the introduction of a sulfiding feed that can include a sulfiding agent or a hydrocarbon feedstock containing a concentration of an organic sulfur compound.

It is a significant aspect of the invention that the support material loaded with an active metal precursor is not calcined or sulfided prior to its loading into a reactor vessel or system for its ultimate use as a hydrodesulfurization catalyst but that it can be sulfided, in situ, in a delayed feed introduction start-up procedure. The delayed feed introduction start-up procedure is hereinafter more fully described. Moreover, it has been determined that an improvement in catalytic activity is obtainable when, prior to hydrogen treatment and sulfiding, the support material loaded with the active metal precursor is filled with either hydrocarbon oil or polar additive or a combination of both a polar additive and hydrocarbon oil. Thus, not only are certain economic benefits realized by eliminating, or at least not incurring, the costs associated with calcination and sulfidation of the catalyst prior to its delivery and use, but also a more active catalyst is obtained.

It has been found that the support material loaded with an active metal precursor but having a substantial or material absence of phosphorous and that is impregnated with either a hydrocarbon oil or a polar additive or both hydrocarbon oil and polar additive before treatment with hydrogen followed by treatment with a sulfur compound provides a hydrotreating catalyst having a greater hydrodesulfurization activity than the support material that is loaded with an active metal precursor and phosphorous and which has been impregnated with hydrocarbon oil or a polar additive or both prior to the hydrogen and sulfur treatments.

It is theorized that the improvement in catalytic activity of the inventive catalyst is in part due to the hydrocarbon oil or polar additive being present in the impregnated composition when it is heated-up in the presence of hydrogen gas by protecting the active catalyst sites therein from reacting with the hydrogen. This is believed to prevent the active phase degradation and sintering that cause activity loss. As for the improvement in catalytic activity that results from the use and presence of the polar additive, it is believed that the polar additive interacts with the molybdenum, for example, molybdenum oxide, contained in the composition in a manner that helps in providing for or maintaining dispersion of the molybdenum metal within the composition.

In the preparation of the inventive composition, any suitable method or means may be used to impregnate the metal loaded support material with the hydrocarbon oil and polar additive. The impregnation with the hydrocarbon oil may be done separately from the impregnation with the polar additive or the impregnation with the hydrocarbon oil may be done coincidentally with impregnation with polar additive. It is preferred to impregnate the metal loaded support material with a mixture or blend of the hydrocarbon oil and polar additive. The hydrocarbon oil and polar additive should be present in the mixture or blend in the desired relative amounts. Due to the physical characteristics of the hydrocarbon oil and polar additive, the mixture or blend of the two will typically be an emulsion with one of the components being dispersed in the other.

The preferred method of impregnation may be any standard well-known pore fill methodology whereby the pore volume is filled by taking advantage of capillary action to draw the liquid into the pores of the metal loaded support material. It is desirable to fill at least 75% of the pore volume of the metal loaded support material with the hydrocarbon oil and polar additive. It is preferred for at least 80% of the pore volume of the metal loaded support material to be filled with the hydrocarbon oil and polar additive, and, most preferred, at least 90% of the pore volume is filled with the hydrocarbon oil and polar additive.

It is thought that the presence of the polar additive in the metal loaded support material in combination with the hydrocarbon oil provides a catalytic benefit and thus the relative weight ratio of the hydrocarbon oil to polar additive incorporated into the metal loaded support material should be in the range upwardly to 10:1 (10 weight parts hydrocarbon oil to 1 weight part polar additive), for example, the weight ratio may be in the range of from 0:1 to 10:1. For a binary mixture of hydrocarbon oil and polar additive, this is in the range of from 0 wt. % to 91 wt. % hydrocarbon oil, based on the weight of the binary mixture.

Typically, the relative weight ratio of hydrocarbon oil to polar additive incorporated into the metal loaded support material should be in the range of from 0.01:1 (1 wt. % for binary mixture) to 9:1 (90 wt. % for a binary mixture). Preferably, this relative weight ratio is in the range of from 0.1:1 (9 wt. % for binary mixture) to 8:1 (89 wt. % for a binary mixture), more preferably, from 0.2:1 (17 wt. % for a binary mixture) to 7:1 (87 wt. % for a binary mixture), and, most preferably, it is in the range of from 0.25:1 (20 wt. % for a binary mixture) to 6:1 (86 wt. % for a binary mixture).

A typical commercial blend of a mixture, comprising hydrocarbon oil and polar additive, that is used to impregnate the metal-loaded support contains a polar additive in the range of from 10 wt. % to 90 wt. % of the total weight of the mixture, and a hydrocarbon oil in the range of from 10 wt. % to 90 wt. % of the total weight of the mixture.

It is desirable, however, for the polar additive to be present in the mixture at a concentration in the range of from 15 wt. % to 60 wt. % with the hydrocarbon oil being present in the mixture at a concentration in the range of from 40 wt. % to 85 wt. %. Preferably, the polar additive is present in the mixture at a concentration in the range of from 20 wt. % to 40 wt. % with the hydrocarbon oil being present in the mixture at a concentration in the range of from 60 wt. % to 80 wt. %.

In the preparation of the polar additive and hydrocarbon oil mixture for impregnation into the metal loaded support material, the polar additive should be present in the mixture at a concentration of at least 10 wt. % of the mixture in order to avoid problems associated with self-heating.

Possible hydrocarbon oils that may be used to prepare the inventive composition can be any suitable hydrocarbon compound or mixture of compounds that provide for the benefits as described herein. Because the hydrogen treatment of the support material that is loaded with an active metal precursor and which is filled or impregnated with the hydrocarbon oil (and also the polar additive) includes exposure thereof to a gaseous atmosphere containing hydrogen at a temperature ranging upwardly to 250° C., to obtain the maximum benefit from the impregnation with the hydrocarbon oil, its boiling temperature should be such that it predominantly remains in the liquid phase at the contacting temperature of the hydrogen-containing gaseous atmosphere during treatment therewith.

In terms of boiling temperature range, the hydrocarbon oil generally should include hydrocarbons having a boiling temperature in the range of from 100° C. to 550° C. and, preferably, from 150° C. to 500° C. Possible suitable hydrocarbon oils for impregnation or incorporation into the support material loaded with an active metal precursor can include crude oil distillate fractions, such as, for example, heavy naphtha, containing hydrocarbons boiling, perhaps, in the range of from 100° C. to 210° C., kerosene, diesel, and gas oil. Among these distillate fractions, diesel is the preferred hydrocarbon oil, which typically includes hydrocarbons having a boiling temperature in the range of from 170° C. to 350° C.

The hydrocarbon oils that are particularly suitable for use in filling the pores of the support material containing a metal component include olefin compounds that are liquid at the elevated contacting temperature of the hydrogen-containing gaseous atmosphere during treatment therewith. The desirable olefins for use as the hydrocarbon oil or a portion thereof are those olefin compounds having a carbon number greater than 12 and, generally, having a carbon number in the range of from 12 to 40 carbons. It is preferred for the olefin compounds for use as the hydrocarbon oil to be those having from 14 to 38 carbons, and, most preferably, the carbon number is in the range of from 16 to 36 carbons. The olefins may be in an admixture with non-olefinic hydrocarbons, such as alkanes or aromatic solvents or any of the above-referenced petroleum distillate fractions, such as, heavy naphtha, kerosene, diesel, and gas oil.

In general, the olefin content of the hydrocarbon oil may be above 5 wt. %, and, in certain instances, it can be desirable for the hydrocarbon oil to have an olefin content exceeding 10 wt. %, and even exceeding 30 wt. %. The olefin compounds may include monoolefins or they may include olefins with multiple carbon double bonds. Particularly desirable olefins for use as the hydrocarbon oil of the invention are alpha-olefins, which are monoolefins with the carbon double bound being located at the alpha carbon of the carbon chain of the olefin compound. An especially preferred hydrocarbon oil is a mixture of alpha olefin hydrocarbon molecules that have from 18 to 30 carbon atoms per molecule.

The polar additive that may be used in the preparation of the inventive composition can be any suitable molecule that provides for the benefits and has the characteristic molecular polarity or molecular dipole moment and other properties, if applicable, as are described herein. Molecular polarity is understood in the art to be a result of non-uniform distribution of positive and negative charges of the atoms that make up a molecule. The dipole moment of a molecule may be approximated as the vector sum of the individual bond dipole moments, and it can be a calculated value.

One method of obtaining a calculated value for the dipole moment of a molecule, in general, includes determining by calculation the total electron density of the lowest energy conformation of the molecule by applying and using gradient corrected density functional theory. From the total electron density the corresponding electrostatic potential is derived and point charges are fitted to the corresponding nuclei. With the atomic positions and electrostatic point charges known, the molecular dipole moment can be calculated from a summation of the individual atomic moments.

As the term is used in this description and in the claims, the "dipole moment" of a given molecule is that as determined by calculation using the publicly available, under license, computer software program named Materials Studio, Revision 4.3.1, copyright 2008, Accerlys Software Inc.

Following below is a brief discussion of some of the technical principles behind the computation method and application of the Materials Studio computer software program for calculating molecular dipole moments.

The first step in the determination of the calculated value of the dipole moment of a molecule using the Materials Studio software involves constructing a molecular representation of the compound using the sketching tools within the visualizer module of Materials Studio. This sketching process involves adding atoms to the sketcher window that constitute the compound and completing the bonds between these atoms to fulfill the recognized bonding connectivity that constitute the compound. Using the clean icon within the Material Studio program automatically orients the constructed compound into the correct orientation. For complex compounds, a conformational search is performed to ensure that the orientation used to calculate the molecular dipole is the lowest energy conformation, i.e., it's natural state.

The quantum mechanical code DMo13 (Delley, B. *J. Chem. Phys.*, 92, 508 (1990)) is utilized to calculate the molecular dipole moments from first principles by applying density functional theory. Density functional theory begins with a theorem by Hohenberg and Kohn (Hohenberg, P.; Kohn, W. "Inhomogeneous Electron Gas", *Phys. Rev. B*, 136, 864-871 (1964); Levy, M. "Universal Variational Functionals of Electron Densities, First-Order Density Matrices, and Natural Spin-Orbitals and Solution of the V-Representability Problem", *Proc. Natl. Acad. Sci. U.S.A*, 76, 6062-6065 (1979)), which states that all ground-state properties are functions of the charge density P. Specifically, the total energy $E_t$ may be written as:

$$E_t[\rho]=T[\rho]+U[\rho]+E_{xc}[\rho] \qquad \text{q.1}$$

where $T[\rho]$ is the kinetic energy of a system of noninteracting particles of density $\rho$, $U[\rho]$ is the classical electrostatic energy due to Coulombic interactions, and $E_{xc}[\rho]$ includes all many-body contributions to the total energy, in particular the exchange and correlation energies.

As in other molecular orbital methods (Roothaan, C. C. J. "New Developments in Molecular Orbital Theory", *Rev. Mod. Phys.*, 23, 69-89 (1951); Slater, J. C. "Statistical Exchange-Correlation in the Self-Consistent Field", *Adv. Quantum Chem.*, 6, 1-92 (1972); Dewar, M. J. S. *J. Mol. Struct.*, 100, 41 (1983)), the wave function is taken to be an antisymmetrized product (Slater determinant) of one-particle functions, that is, molecular orbitals:

$$\Psi = A(n)|\varphi_1(1)\varphi_2(2) \ldots \varphi_n(n) \qquad \text{q.2}$$

The molecular orbitals also must be orthonormal:

$$\langle \varphi_i | \varphi_j \rangle = \delta_{ij} \qquad \text{q.3}$$

The charge density summed over all molecular orbitals is given by the simple sum:

$$\rho(r) = \sum_i |\phi_i(r)|^2 \qquad \text{q.4}$$

where the sum goes over all occupied molecular orbitals $\varphi_i$. The density obtained from this expression is also known as the charge density. From the wavefunctions and the charge density the energy components from Eq. 1 can be written (in atomic units) as:

$$T = \left\langle \sum_i^n \phi_i \left| \frac{-\nabla^2}{2} \right| \phi_i \right\rangle \qquad \text{q.5}$$

In Eq. 6, $Z\alpha$ refers to the charge on nucleus (X of an N-atom system. Further, in Eq. 6, the term $\rho(r_1)V_N$, represents the electron-nucleus attraction, the term $\rho(r_1)V_e(r_1)/2$, represents the electron-electron repulsion, and the term, $V_{NN}$, represents the nucleus-nucleus repulsion.

$$U = \sum_i^n \sum_\alpha^N \left\langle \phi_i(r) \left| \frac{-Z}{R_\alpha - r} \right| \phi_i(r) \right\rangle + \qquad \text{q. 6}$$

$$\frac{1}{2} \sum_i \sum_j \left\langle \phi_i(r_1)\phi_j(r_2) \frac{1}{r_1 - r_2} \phi_i(r_1)\phi_j(r_2) \right\rangle +$$

$$\sum_\alpha^N \sum_{\beta<\alpha} \frac{Z_\alpha Z_\beta}{|R_\alpha - R_\beta|}$$

$$= -\sum_\alpha^N \left\langle \rho(r_1) \frac{Z_\alpha}{|R_\alpha - r_1|} \right\rangle + \frac{1}{2} \left\langle \rho(r_1)\rho(r_2) \frac{1}{|r_1 - r_2|} \right\rangle +$$

$$\sum_\alpha^N \sum_{\beta<\alpha} \frac{Z_\alpha Z_\beta}{|R_\alpha - R_\beta|}$$

$$\equiv \langle -\rho(r_1)V_N \rangle + \left\langle \rho(r_1) \frac{V_e(r_1)}{2} \right\rangle + V_{NN}$$

The term, $E_{xc}[\rho]$ in Eq. 1, the exchange-correlation energy, requires some approximation for this method to be computationally tractable. A simple and surprisingly good approximation is the local density approximation, which is based on the known exchange-correlation energy of the uniform electron gas. (Hedin, L.; Lundqvist, B. I. "Explicit Local Exchange Correlation Potentials", *J. Phys. C*, 4, 2064-2083 (1971); Ceperley, D. M.; Alder, B. J. "Ground State of the Electron Gas by a Stochastic Method", *Phys. Rev. Lett.*, 45, 566-569 (1980)). The local density approximation assumes that the charge density varies slowly on an atomic scale (i.e., each region of a molecule actually looks like a uniform electron gas). The total exchange-correlation energy can be obtained by integrating the uniform electron gas result:

$$\epsilon_{xc}[\rho] \cong \int \rho(r)\epsilon_{xc}[\rho(r)]dr \qquad \text{q.7}$$

where $E_{xc}[\rho]$ is the exchange-correlation energy per particle in a uniform electron gas and $\rho$ is the number of particles. In this work the gradient corrected exchange-correlation functional PW91 is used (Perdew, J. P.; Wang, Y. *Phys. Rev. B*, 45, 13244 (1992)).

With all the components derived to describe the total energy of any molecular system within the density functional formalism, the dipole moment can be calculated from a summation of the individual electronic and nuclear dipole moment vectors which are displayed at the end of the DMo13 output file.

References herein to the polar additive are understood to mean a molecule that has polarity and having a dipole moment, as calculated by the aforementioned Materials Studio software or other known method that will provide substantially the same calculated value for the dipole moment of a molecule as the Materials Studio software will provide, which exceeds the dipole moment of the hydrocarbon oil that is used in the inventive composition.

The dipole moment of the polar additive should be at least or exceed 0.45. However, it is preferred for the polar additive to have a characteristic dipole moment that is at least or exceeds 0.5, and, more preferred, the dipole moment of the polar additive should be at least or exceed 0.6. A typical upper limit to the dipole moment of the polar additive is up to about 5, and, thus, the dipole moment of the polar additive may be, for example, in the range of from 0.45 to 5. It is preferred for the dipole moment of the polar additive to be in the range of from 0.5 to 4.5, and, more preferred, the dipole moment is to be in the range of from 0.6 to 4.

As alluded to above, it is theorized that the polarity of the polar additive is significant to the invention; because, the polarity is required for the interaction with the surface of the support material and active metal components of the support material of the inventive composition. It is by these interactions that physical and chemical bonds with the active phases of the inventive composition are formed.

A particularly desirable attribute of the polar additive is for it to be a heterocompound. A heterocompound is considered herein to be a molecule that includes atoms in addition to carbon and hydrogen. These additional atoms can include, for example, nitrogen or oxygen, or both. It is desirable for the group of heterocompounds to exclude those heterocompounds that include sulfur, and, in all cases, the polar additive does not include paraffin and olefin compounds, i.e. compounds that contain only carbon and hydrogen atoms. Considering the exclusion of sulfur-containing compounds from the definition of the group of heterocompounds, it can further be desirable for the oil or additive or oil/additive impregnated composition, before its treatment with hydrogen and sulfur, to exclude the material presence of a sulfur-containing compound.

Specific polar compounds that may be suitable for use as the polar additive of the invention are presented in the following Table 1, which also includes their calculated dipole moments.

TABLE 1

Polar Compounds and Their Calculated Dipole Moments

| Compound | Formula | Class | Boiling Point (° C.) | Calc. Dipole Moment |
|---|---|---|---|---|
| 2,4-pentanedione | $C_5H_8O_2$ | Diketone | 140 | 1.59 |
| Triethylphosphate | $C_6H_{15}O_4P$ | Phosphate | 215-216 | 3.25 |
| Triethylphosphite | $C_6H_{15}O_3P$ | Phosphite | 156 | 0.64 |
| 1-pentanol | $C_5H_{12}O$ | Alcohol | 138 | 1.85 |
| Guanidine | $CH_5N_3$ | Imine | | 3.8 |
| Alanine | $C_3H_7NO_2$ | Amino acid | | 2.16 |
| Glycine | $C_2H_5NO_2$ | Amino acid | | 5.81 |
| Ethyleenediamine | $C_2H_8N_2$ | Diamine | 116 | 2.46 |
| Monoethanolamine | $C_2H_7NO$ | Alcohol-amine | 170 | 3.42 |
| Tetramethylurea | $C_5H_{12}N_2O$ | Diamine | 174-178 | 3.44 |
| Acetonitrile | $C_2H_3N$ | Nitrile | 82 | 3.87 |
| n-methylpyrrolidone | $C_5H_9NO$ | Cyclic-amide | 202 | 3.92 |
| glucose | $C_6H_{12}O_6$ | sugar | | 4.38 |
| Sucrose | $C_{12}H_{22}O_{11}$ | sugar | | 7.45 |
| Octylamine | $C_8H_{19}N$ | Amine | 175-176 | 1.36 |
| Phenylboromic acid | $C_6H_7BO_2$ | Boric acid | | 5.86 |
| n-etylcarbazole | $C_{14}H_{13}N$ | Carbazole | | 1.93 |
| Acetophenone | $C_8H_8O$ | ketone | 202 | 3.15 |
| Diethyleneglycol | $C_4H_{10}O_3$ | Alcohol | 244-245 | 2.76 |
| Dibenzofuran | $C_{12}H_8O$ | Oxygen heterocycle | | 0.78 |
| Dimethylformamide | $C_3H_7NO$ | Amide | 153 | 4.02 |
| Citric acid | $C_6H_8O_7$ | | 175 | 3.37 |
| Ethylenediamine-tetraacetic acid | $C_{10}H_{16}N_2O_8$ | | | 3.99 |
| Nitriltriacetic acid | $C_6H_9NO_6$ | | | 1.58 |

A preferred characteristic of the polar additive is for its boiling temperature to be in the range of from 50° C. to 275° C. More preferably, the boiling temperature of the polar additive is to be in the range of from 60° C. to 250° C., and, most preferably, it is in the range of from 80° C. to 225° C.

The most desirable compounds for use as the polar additive of the invention are those selected from the group of amide compounds, which includes dimethylformamide.

A particularly important aspect of the invention is for the support material having a metal component incorporated therein to be uncalcined and non-sulfided when it is impregnated with the hydrocarbon oil or polar additive or a combination of both. Cost savings in the preparation of the composition are realized by not having to perform the calcination or sulfidation steps. But, moreover, it has been found that, when the hydrocarbon oil or polar additive or oil/additive impregnated composition is further subjected to a hydrogen treatment and sulfur treatment, the resulting catalyst composition exhibits enhanced catalytic activity.

Before the incorporation of the hydrocarbon oil or polar additive or combination of oil and polar additive into the support material having a metal component incorporated therein, particularly when the metal component is added to the support material by impregnation using an aqueous solution of a metal salt (metal-impregnated support material), it is important for this metal-impregnated support material to be dried so as to remove at least a portion of the volatile liquid contained within the pores of the support material so as to provide pore volume that can be filled with the hydrocarbon oil and polar additive. The metal-impregnated support material, thus, is dried under drying conditions that include a drying temperature that is less than a calcination temperature.

A significant feature of the invention is that the drying temperature under which the drying step is conducted does not to exceed a calcination temperature. Thus, the drying temperature should not exceed 400° C., and, preferably, the drying temperature at which the metal-impregnated support material is dried does not exceed 300° C., and, most preferably, the drying temperature does not exceed 250° C. It is understood that the drying step will, in general, be conducted at lower temperatures than the aforementioned temperatures, and, typically, the drying temperature will be conducted at a temperature in the range of from 60° C. to 150° C.

The drying of the metal-impregnated support material is preferably controlled in a manner so as to provide the resulting dried metal-impregnated support material having a volatiles content that is in a particular range. The volatiles content of the dried metal-impregnated support material should be controlled so that it does not exceed 20 wt. % LOI. The LOI, or loss on ignition, is defined as the percentage weight loss of the material after its exposure to air at a temperature of 482° C. for a period of two hours, which can be represented by the following formula: (sample weight before exposure less sample weight after exposure) multiplied by 100 and divided by (sample weight before exposure). It is preferred for the LOI of the dried metal-impregnated support material to be in the range of from 1 wt. % to 20 wt. %, and, most preferred, from 3 wt. % to 15 wt. %. The dried metal-impregnated support material is further impregnated with the hydrocarbon oil and polar additive as earlier described herein.

The polar additive or hydrocarbon oil or oil/additive impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. As earlier noted, the hydrocarbon oil or polar additive or oil/additive impregnated composition can first undergo a hydrogen treatment that is then followed with treatment with a sulfur compound.

The hydrogen treatment includes exposing the hydrocarbon oil or polar additive or oil/additive impregnated composition to a gaseous atmosphere containing hydrogen at a temperature ranging upwardly to 250° C. Preferably, the hydrocarbon oil or polar additive or oil/additive impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The hydrocarbon oil or polar additive or oil/additive impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the hydrocarbon oil or polar additive or oil/additive impregnated composition after it has been treated with hydrogen can be done using any conventional method known to those skilled in the art. Thus, the hydrogen treated hydrocarbon oil or polar additive or oil/additive impregnated composition can be contacted with a sulfur-containing compound, which can be hydrogen sulfide or a compound that is decomposable into hydrogen sulfide, under the contacting conditions of the invention.

Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated hydrocarbon oil or polar additive or oil/additive impregnated composition to their sulfided form. Typically, the sulfiding temperature at which the hydrogen treated hydrocarbon oil or polar additive or oil/additive impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated hydrocarbon oil or polar additive or oil/additive impregnated composition is sulfided generally can be in the range of from 1 bar to 70 bar, preferably, from 1.5 bar to 55 bar, and, most preferably, from 2 bar to 35 bar.

As noted above, one of the benefits provided by the hydrocarbon oil or polar additive or oil/additive impregnated composition of the invention is that it can be utilized in a reactor system that is started up using a so-called delayed feed introduction procedure. In the delayed feed introduction procedure, the reactor system, which includes a reactor vessel containing the inventive hydrocarbon oil or polar additive or oil/additive impregnated composition, first undergoes a heating step to raise the temperature of the reactor and the hydrocarbon oil or polar additive or oil/additive impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the hydrocarbon oil or polar additive or oil/additive impregnated composition, it is thereafter treated with a sulfur compound in the manner as earlier described herein.

It has been found that the inventive hydrocarbon oil or polar additive or oil/additive containing composition that has a substantial or material absence of or no phosphorous, after undergoing the hydrogen treatment followed by treatment with a sulfur compound, exhibits a greater catalytic activity toward hydrodesulfurization of heavy hydrocarbon feedstocks than do other similar compositions that additionally contain phosphorous as one of their components. As discussed earlier herein, it is theorized that the incorporation of phosphorous into the composition may result in the formation of aluminum phosphate within the alumina support which may result in inhibiting the mass transfer of molecules within the composition when it is used in the catalytic hydrodesulfurization of heavy hydrocarbon feedstocks.

It is recognized that the hydrocarbon oil or polar additive or oil/additive impregnated composition of the invention, after its treatment with hydrogen and sulfur, is a highly effective catalyst for use in the hydrotreating of hydrocarbon feedstocks. This catalyst is particularly useful in applications involving the hydrodesulfurization of heavy hydrocarbon feedstocks, and, especially, it has been found to be an excellent catalyst for use in the hydrodesulfurization of vacuum gas oil and residuum feedstocks to provide sulfur reductions of at least or greater than 75% of the feedstock sulfur or even greater than 80%. It is preferred that greater than 90% sulfur reduction is achieved with the use of the inventive composition, and, more preferably, the sulfur reduction is greater than 95%. Sulfur reduction is defined as being the difference between the sulfur content of the hydrocarbon feedstock and of the desulfurized product with the difference divided by the sulfur content of the hydrocarbon feedstock and with this calculated value being multiplied by 100 to provide a value that is indicated as a percentage.

In hydrotreating applications, the inventive hydrocarbon oil or polar additive or oil/additive impregnated composition is preferably used in a delayed feed introduction procedure or otherwise treated with hydrogen and sulfur, as described above. The inventive composition is contacted under suitable hydrodesulfurization conditions with a hydrocarbon feedstock that typically has a concentration of sulfur.

The hydrocarbon feedstock may be any feedstock that can suitably be treated using the inventive compositions described herein and can include the petroleum middle distillates as well as heavier petroleum hydrocarbon feedstocks such as atmospheric resid or the light and heavy vacuum gas oils or vacuum resid. The more typical and preferred hydrocarbon feedstock is a heavy petroleum cut having a 5% boiling temperature (T5), as defined by ASTM test D-2887, that is in the range of from 250° C. (482° F.) to 375° C. (707° F.). The initial boiling temperature of this hydrocarbon feedstock may be in the range of from 175° C. (347° F.) to 375° C. (707° F.). The 95% boiling temperature (T95) of this hydrocarbon feedstock, as defined by ASTM D-2887, is in the range of from 450° C. (842° F.) to 650° C. (1202° F.). The final boiling temperature of this hydrocarbon feedstock may be in the range of from 475° C. (887° F.) to 650° C. (1202° F.). A petroleum vacuum resid may have an initial boiling temperature of at least 538° C. (1000° F.).

Examples of other refinery streams that may be used as the hydrocarbon feedstock include middle distillates that include straight run distillate fuels boiling in the boiling range of from 140° C. (284° F.) to 410° C. (770° F.), such as, kerosene, jet fuel, light diesel oil, heating oil, heavy diesel oil, and the cracked distillates, such as FCC cycle oil, coker gas oil, and hydrocracker distillates.

The sulfur concentration of the hydrocarbon feedstock can be a high concentration, for instance, in the range upwardly to about 5 weight percent of the hydrocarbon feedstock based on the weight of elemental sulfur and the total weight of the hydrocarbon feedstock inclusive of the sulfur compounds. Typically, however, the hydrocarbon feedstock of the inventive process has a sulfur concentration in the range of from 0.1 wt. % (1000 ppmw) to 4 wt. % (40,000). But, more typically, the sulfur concentration is in the range of from 0.5 wt. % (5000 ppmw) to 3 wt. % (30,000 ppmw), and, most typically, from 0.75 wt. % (7500 ppmw) to 2.5 wt. % (25,000 ppmw). It is understood that the references herein to the sulfur content of the hydrocarbon feedstock are to those compounds that are normally found in a heavy hydrocarbon feedstock or in the hydrodesulfurized product and are chemical compounds that contain a sulfur atom and which generally include organosulfur compounds.

The hydrocarbon oil or polar additive or oil/additive impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.). It is recognized that one of the unexpected features of the use of the inventive hydrocarbon oil or polar additive or oil/additive impregnated composition of the invention is that, in a delayed feed introduction application, the resultant catalyst has a significantly higher catalytic activity than certain other alternative catalyst compositions, and, thus, it will, in general, provide for comparatively lower required process temperatures for a given amount of desulfurization.

The flow rate at which the hydrocarbon feedstock is charged to the reaction zone of the inventive process is generally such as to provide a liquid hourly space velocity (LHSV) in the range of from 0.01 hr$^{-1}$ to 10 hr$^{-1}$. The term "liquid hourly space velocity", as used herein, means the numerical ratio of the rate at which the hydrocarbon feedstock is charged to the reaction zone of the inventive process in volume per hour divided by the volume of catalyst contained in the reaction zone to which the hydrocarbon feedstock is charged. The preferred LHSV is in the range of from 0.05 hr$^{-1}$ to 5 hr$^{-1}$, more preferably, from 0.1 hr$^{-1}$ to 3 hr$^{-1}$, and, most preferably, from 0.2 hr$^{-1}$ to 2 hr$^{-1}$.

It is preferred to charge hydrogen along with the hydrocarbon feedstock to the reaction zone of the inventive process. In this instance, the hydrogen is sometimes referred to as hydrogen treat gas. The hydrogen treat gas rate is the amount of hydrogen relative to the amount of hydrocarbon feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The desulfurized product yielded from the process of the invention has a low or reduced sulfur concentration relative to the hydrocarbon feedstock. A particularly advantageous aspect of the inventive process is that it is capable of providing a deeply desulfurized hydrocarbon product. As already noted herein, the desulfurized product having sulfur content that is reduced below that of the hydrocarbon feedstock of more than 75%.

The following examples are presented to further illustrate certain aspects of the invention, but they are not to be construed as limiting the scope of the invention.

EXAMPLE 1

This Example 1 describes the preparation of the support and its properties that was used in making both the comparison compositions and the inventive compositions.

Alumina and water were mixed to form an extrudable mixture that was shaped into 1.3 mm Trilobe extrudates. The shaped mixture was then dried and calcined using standard methods so as to provide an alumina support carrier for the loading of active metals and polar additive or hydrocarbon oil, or both, to provide comparison and inventive compositions. The following Table 2 presents certain of the physical properties of the shaped support.

TABLE 2

Properties of Shaped Support

| PROPERTY | VALUE |
| --- | --- |
| Shape | 1.3 mm Trilobe |
| Surface Area (m$^2$/g) | 245 to 320 |
| Mean Pore Diameter (Ang.) | 80 to 100 |
| Pore Volume > 350 Å | Less than 5 |
| Water Pore Volume (cc/g) | 0.74 to 0.90 |
| Nickel (wt. %) | None |

EXAMPLE 2 (AMMONIA BASED IMPREGNATION SOLUTION WITHOUT PHOSPHOROUS)

This Example 2 describes the preparation of inventive Composition A that contains no phosphorous. Additionally, this Example presents the metal loadings and selected physical properties of Composition A.

An amount of the Shaped Support of Example 1 was impregnated with an aqueous impregnation solution that included water, a molybdenum compound (e.g. ammonium dimolybdate), a cobalt compound (e.g. cobalt carbonate or cobalt hydroxide), a small amount of monoethanolamine, and aqueous ammonia such as to provide for a pH of the final aqueous impregnation solution of approximately 10. The aqueous impregnation solution contained no phosphorous or compound of phosphorous, such as, for example, phosphoric acid or any of the phosphorus oxoacids.

A volume of the aqueous impregnation solution was used to fill the pores of the Shaped Support so as to load it with the targeted metal content. The impregnated Shaped Support was thereafter dried at a temperature in the range of from 80° C. to 200° C., but with the temperature being kept below a calcination temperature, to reduce its volatiles content to the range of from 6 wt. % to 15 wt. % Loss on Ignition (LOI). The dried, impregnated Shaped Support was not calcined prior to the incorporation therein of the polar additive or hydrocarbon oil, or both. Composition and physical properties of the dried, impregnated Shaped Support, on a dry basis, are presented in the following Table 3.

TABLE 3

Properties of the Dried, Impregnated Shaped Support

| PROPERTY | TARGETED VALUE |
| --- | --- |
| Molybdenum (MoO3) wt. % | 13.6% as metal/20.4 as oxide |
| Cobalt (CoO) wt. % | 3.4% as metal/4.3 as oxide |
| Nickel | None |
| Phosphorous | None |
| Water Pore Volume cc/g | 0.40-0.60 |
| Loss on Ignition (LOI) wt. % | 10 |

The dried, impregnated Shaped Support was then impregnated by filling approximately 90% of its pore volume with dimethylformamide (DMF) to provide the final Composition A that was used in the testing.

A Comparison Composition was prepared in the same manner as was Composition A with the exception that the impregnation solution was not an ammonia based solution and it included a phosphorous compound (e.g. phosphoric acid). The impregnation solution was prepared by dissolving cobalt hydroxide (Co(OH)$_2$), molybdenum trioxide (MoO$_3$) and phosphoric acid in de-ionized water with heating and stirring. The final metals loading of the Comparison Composition was 15.4 wt. % molybdenum, 4.3 wt. % cobalt, and 1.4 wt. % phosphorous.

EXAMPLE 3 (CITRIC ACID BASED IMPREGNATION SOLUTION WITHOUT PHOSPHOROUS)

This Example 3 describes the preparation of inventive Composition B using an acidic solution that contains no phosphorous, and the Example presents the metal loadings and selected physical properties of Composition B.

An amount of the Shaped Support of Example 1 was impregnated with an acidic, or low-pH, aqueous solution that included water, a molybdenum compound (e.g. molybdenum trioxide), a cobalt compound (e.g. cobalt carbonate or cobalt hydroxide), and citric acid added in an amount sufficient to dissolve the metal salts with an approximate molar ratio of total metal to citric acid being 1:1. The aqueous impregnation solution contained no phosphorous or compound of phosphorous, such as, for example, phosphoric acid or any of the phosphorus oxoacids and the pH was less than 2.

A volume of the aqueous impregnation solution was used to fill the pores of the Shaped Support so as to load it with the targeted metal content. The impregnated Shaped Support was thereafter dried at a temperature in the range of from 80° C. to 250° C., but with the temperature being kept below a calcination temperature, to reduce its volatiles content to the range of from 6 wt. % to 20 wt. % Loss on Ignition (LOI). The dried impregnated Shaped Support was not calcined prior to the incorporation of the polar additive or hydrocarbon oil, or both. The dried, impregnated Shaped Support, on a dry basis, contained 13.6 wt. % molybdenum, as metal (20.4 wt. % as oxide) and 3.4 wt. % cobalt, as metal (4.3 wt. % as oxide).

The dried, impregnated Shaped Support was then impregnated by filling approximately 90% of its pore volume with DMF to provide the final Composition B that was used in the testing.

EXAMPLE 4

This Example 4 describes the apparatus and method for testing the activity of the inventive compositions that contain no phosphorous and comparison composition that contains phosphorous.

The tests were conducted using a four-reactor testing unit operated in the trickle-flow mode and in an isothermal regime. The reactors had an internal diameter of 15 mm Each reactor tube was loaded with a pre-mixed mixture of 20 cc of whole catalyst pellets and 51 cc of 60-80 mesh silicon carbide.

The catalyst was activated using a delayed-feed introduction procedure whereby the composition was first heated up and conditioned by contacting it with pure hydrogen at the operating pressure and at a temperature in the range of from 149° C. (300° F.) for a time period of about 12 hours. Following this hydrogen treatment, the composition was sulfided using a liquid hydrocarbon containing dimethyldisulfide (DMDS) to provide a sulfur content of 2.5%.

The activity of each of the compositions was tested by charging the reactor with a vacuum gas oil feedstock having the properties presented in Table 4.

TABLE 4

Properties of Vacuum Gas Oil Used in the Testing of Inventive Catalyst

| Property of VGO | Value for VGO-1 | Value for VGO-2 |
| --- | --- | --- |
| Density (g/ml) | 0.9277 | 0.9388 |
| Sulfur (wt. %) | 1.61 | 1.94 |
| Nitrogen (wt. %) | 0.144 | 0.197 |
| Distillation (D-2887) | | |
| IBP | 375° F. (191° C.) | 549° F. (287° C.) |
| 5% | 571° F. (299° C.) | 637° F. (336° C.) |
| 50% | 813° F. (434° C.) | 823° F. (439° C.) |
| 95% | 976° F. (524° C.) | 1023° F. (551° C.) |
| FBP | 997° F. (536° C.) | 1116° F. (602° C.) |

The reactor was operated at a pressure of either 600 psig, when processing the VGO-1, or 670 psi, when processing the VGO-2. The feed charge rate to the reactor was set so as to provide a liquid hourly space velocity (LHSV) of either 0.75 hr$^{-1}$, for the VGO-1 processing, or 1.36 hr$^{-1}$ for the VGO-2 processing. The hydrogen gas rate charged to the reactor was either 3260 scfH$_2$/bbl, for the VGO-1 processing, or 1250 scf H$_2$/bbl, for the VGO-2 processing. The weight average bed temperature (WABT) was adjusted to provide for either 95%, for the VGO-1 processing, or 90%, for the VGO-2 processing, hydrodesulfurization treatment of the feed.

Figure 1:
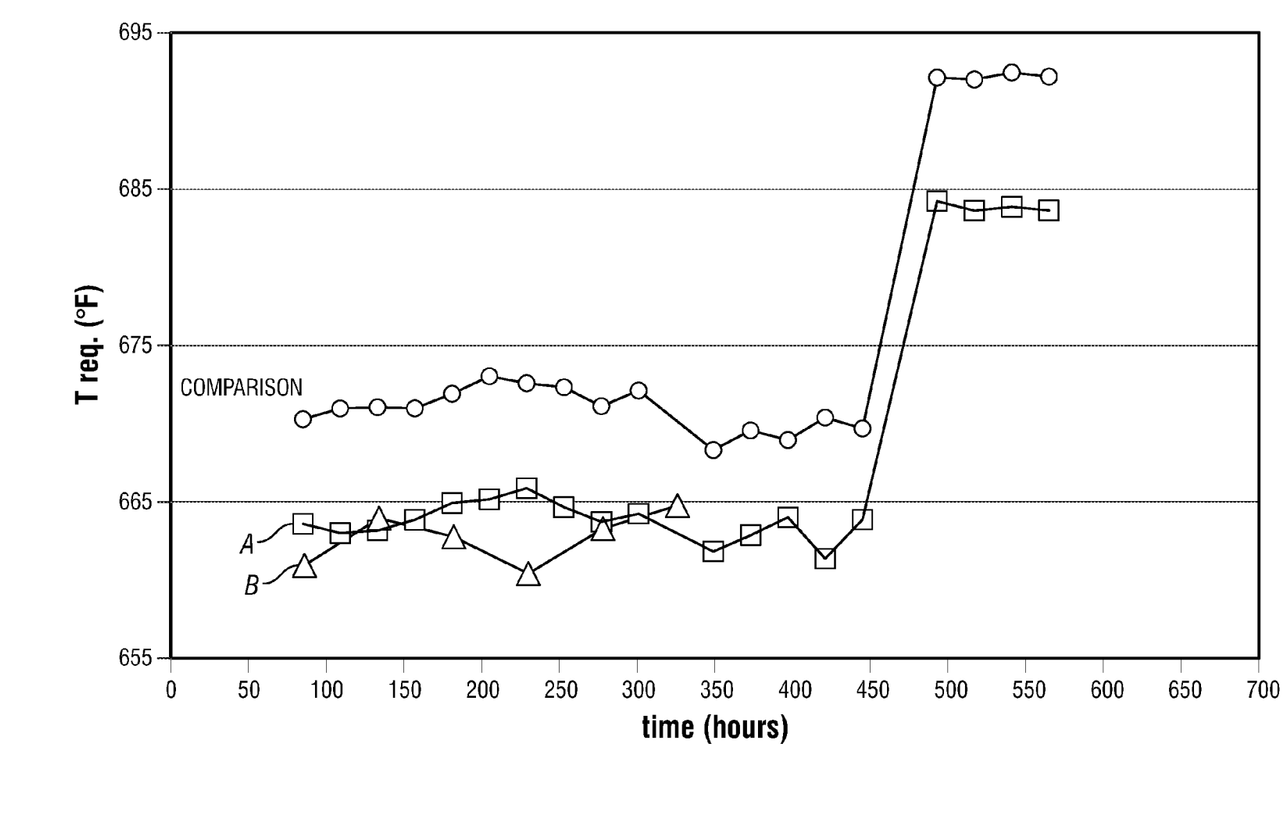
FIG. 1 presents comparison plots of the hydrodesulfurization activity (weighted average bed temperature (WABT) required for 95% desulfurization) versus catalyst age for two inventive catalysts and a comparison catalyst.

FIG. 1 presents the results of the testing with plots of the WABT as a function of run length or catalyst age (in hours) for the inventive Composition A, inventive Composition B, and the Comparison Composition. It can be observed from these plots that Composition A and Composition B exhibit significantly better hydrodesulfurization catalytic activity than does the Comparison Composition by requiring a much lower temperature to achieve the specified sulfur reduction of the feedstock.

That which is claimed is:

1. A process, comprising: contacting under hydrodesulfurization conditions a hydrocarbon feedstock with a composition having a less than 0.1 wt. % phosphorous and comprising a metal-impregnated support material comprising a calcined support material impregnated with a metal compound, wherein said metal-impregnated support material is dried at a drying temperature in the range of from 50° C. to 200° C. but not calcined, prior to impregnation therein of a polar additive, wherein said polar additive excludes heterocompounds that include sulfur, and has a dipole moment of at least 0.45, and wherein said polar additive has a boiling point in the range of from 50° C. to 275° C., to provide a polar additive impregnated composition and wherein said composition comprising said metal-impregnated support material and said polar additive has undergone a hydrogen treatment at a temperature in the range from 100° C. to 225° C. followed by sulfiding.

2. A process as recited in claim 1, wherein said polar additive is selected from a heterocompound group consisting of heterocompounds.

3. A process as recited in claim 2, wherein said heterocompound group excludes paraffin and olefin hydrocarbon compounds.

4. A process as recited in claim 3, wherein said metal compound includes a first metal component selected from the group consisting of cobalt and nickel, and wherein said first metal component is present in said composition in an amount in the range of from 0.5 wt. % to 20 wt. %.

5. A process as recited in claim 4, wherein said metal compound includes a second metal component selected from the group consisting of molybdenum and tungsten, and wherein said second metal component is present in said composition in an amount in the range of from 5 wt. % to 50 wt. %.

6. A process as recited in claim 5, wherein said composition further comprising a hydrocarbon oil present therein in an amount so as to provide a weight ratio of said hydrocarbon oil to polar additive in the range upwardly to 10:1.

7. A process as recited in claim 6, wherein said hydrocarbon oil comprises hydrocarbons having a boiling temperature in the range of from 100° C. to 550° C. and is selected from hydrocarbon mixtures of the group consisting of heavy naphtha, kerosene, diesel, gas oil, olefins having carbon numbers in the range of from 12 to 40 carbons, and mixtures of alpha olefins having carbon numbers in the range of from 18 to 30.

8. A process comprising: contacting under hydrodesulfurization conditions a hydrocarbon feedstock with a composition having less than 0.1 wt. % phosphorous and comprising of: a calcined support material that is loaded with an active metal precursor, wherein said calcined support material that is loaded with said active metal precursor is dried at a drying temperature in the range of from 50° C. to 200° C. but is not calcined thereby providing a dried metal impregnated calcined support material and a polar additive impregnated into said dried metal impregnated calcined support material giving a polar additive impregnated composition wherein said polar additive excludes heterocompounds that include sulfur, and has a dipole moment of at least 0.45, and wherein said polar additive has a boiling point in the range of from 50° C. to 275° C., and wherein said polar additive impregnated composition is thereafter treated with hydrogen at a temperature in the range from 100° C. to 225° C. followed by sulfiding.

9. A process as recited in claim 8, wherein said polar additive is selected from a heterocompound group consisting of heterocompounds.

10. A process as recited in claim 9, wherein said heterocompound group excludes paraffin and olefin hydrocarbon compounds.

11. A process as recited in claim 10, wherein said active metal precursor is a metal compound that includes a first metal component selected from the group consisting of cobalt and nickel, and wherein said first metal component is present in said composition in an amount in the range of from 0.5 wt. % to 20 wt. %.

12. A process as recited in claim 11, wherein said metal compound further includes a second metal component selected from the group consisting of molybdenum and tungsten, and wherein said second metal component is present in said composition in an amount in the range of from 5 wt. % to 50 wt. %.

13. A process as recited in claim 12, further comprising a hydrocarbon oil present therein in an amount so as to provide a weight ratio of said hydrocarbon oil to polar additive in the range upwardly to 10:1.

14. A process as recited in claim 12, wherein said hydrocarbon oil comprises hydrocarbons having a boiling temperature in the range of from 100° C. to 550° C. and is selected from hydrocarbon mixtures of the group consisting of heavy naphtha, kerosene, diesel, gas oil, olefins having carbon numbers in the range of from 12 to 40 carbons, and mixtures of alpha olefins having carbon numbers in the range of from 18 to 30.

15. A process as recited in claim 14, wherein the weight ratio of said hydrocarbon oil to polar additive is in the range of from 0.1:1 to 8:1.

* * * * *